United States Patent [19]

Steuernagle

[11] 4,422,674

[45] Dec. 27, 1983

[54] TAMPER PROOF GAS METER

[75] Inventor: Richard L. Steuernagle, DuBois, Pa.

[73] Assignee: Rockwell International Corporation, Pittsburgh, Pa.

[21] Appl. No.: 203,305

[22] Filed: Nov. 3, 1980

[51] Int. Cl.³ ............................................. F16L 55/00
[52] U.S. Cl. ........................................ 285/30; 73/201;
285/45; 285/81; 285/331; 285/DIG. 22
[58] Field of Search ............... 285/30, DIG. 22, 3,
285/45, 81, 331; 73/201

[56] References Cited

U.S. PATENT DOCUMENTS

| 101,501 | 4/1870 | Perkes . | |
|---|---|---|---|
| 616,128 | 12/1898 | Moody . | |
| 1,257,785 | 2/1918 | Benzinger | 285/331 |
| 1,473,751 | 11/1923 | Walker . | |
| 1,480,472 | 1/1924 | Sauton | 285/30 |
| 1,579,954 | 2/1924 | Sauton . | |
| 1,678,955 | 11/1926 | Rockenbauer . | |
| 1,814,412 | 7/1929 | Rutten . | |
| 1,835,924 | 12/1931 | Bartholomay | 73/201 X |
| 1,919,701 | 9/1932 | Morreale et al. . | |
| 2,067,028 | 10/1935 | Talaga . | |
| 2,720,332 | 10/1955 | Holt | 285/DIG. 22 X |
| 3,794,098 | 2/1974 | Versen | 285/3 X |
| 3,815,859 | 6/1974 | Leopold, Jr. et al. | 285/30 X |
| 3,915,478 | 10/1975 | Al et al. | 285/45 |
| 4,030,850 | 6/1977 | Hyde | 285/DIG. 22 X |
| 4,114,929 | 9/1978 | Knapp | 285/45 |
| 4,214,779 | 7/1980 | Losell | 285/DIG. 22 X |
| 4,225,162 | 9/1980 | Dola | 285/DIG. 22 X |

FOREIGN PATENT DOCUMENTS

| 67082 | 11/1943 | Norway | 285/331 |
| 481688 | 3/1938 | United Kingdom | 285/45 |

*Primary Examiner*—Thomas F. Callaghan

[57] ABSTRACT

Disclosed is a gas meter provided with means for preventing unauthorized disconnection from the gas pipeline and unauthorized access to the interior of the meter housing.

9 Claims, 3 Drawing Figures

TAMPER PROOF GAS METER

BACKGROUND OF THE INVENTION

This invention relates to gas meters of the general type shown in U.S. Pat. No. 2,554,665 dated Mar. 13, 1951, and is particularly directed to means to prevent tampering with the meter by unauthorized persons to produce an erroneous indication of the amount of gas having been consumed. Because of the dramatic increase in the cost of gas and other energy in recent years, the amount of tampering with gas meters by the consumers in an effort to alter or prevent registration of gas flowing throught the meter has also risen dramatically. Gas utilities and manufacturers of gas meters have, therefore, become increasingly concerned with the development of means to prevent such tampering.

The usual methods employed to prevent or alter meter registration are to either alter the flow through the meter by completely bypassing the meter or reversing the flow through the meter, either of which required disconnection of the meter from the pipeline, or gaining access to the interior of the meter to cause the mechanism within the meter to produce an erroneous indication of the gas passed through the meter.

The prior art discloses numerous attempts to prevent tampering with gas meters, typical of which are the U.S. patents to Perkes U.S. Pat. No. 101,501; Moody U.S. Pat. No. 616,128; Walker U.S. Pat. No. 1,473,751; Sauton U.S. Pat. No. 1,579,954; Rockenbauer U.S. Pat. No. 1,678,955; Rutten U.S. Pat. No. 1,814,412; Morreale et al U.S. Pat. No. 1,919,701; and Talaga U.S. Pat. No. 2,067,028. In each case, however, the devices disclosed in the prior art are excessively complicated, expensive to manufacture, require special connections to connect the meter to the pipeline, or are simply inadequate to provide the necessary degree of security. The patent to Perkes for example shows a two-part device which prevents disconnect of two pipes so long as the two parts of the device are held together by a screw, access to which is guarded by seal material. Not only is this device complicated, but requires a seal which can be removed and then replaced at the will of the consumer.

The patent to Moody shows a cap 7 which prevents rotation of the connecting nut 3 so long as the seal material 10 is in place. Such an arrangement not only requires a special pipe having slots 5, but is also dependent on the presence of seal material 10 which can be removed and then replaced.

The patent to Walker shows a water meter in which the removal of an access plate is prevented by a bar which spans the access plate, the bar being locked to the coupling nuts by means of which the meter is mounted in the pipeline. Unauthorized disengagement of the nuts is prevented by sealed wire which is threaded through registering openings in the nuts. Again, the disclosed arrangement requires a seal as well as coupling nuts of special design to accomodate the seal wire and the sealing bar. Additionally, a lock is required to prevent removal of the sealing bar.

The patent to Sauton shows an elaborate, complicated arrangement in which a bar comprised of members 5 and mating members 10 and 11 extend across the top of the meter from a housing arrangement which encloses the nuts connecting the external pipeline to the inlet and outlet of the meter. Not only is the protective arrangement complicated and exensive, but as stated on page 3, lines 68–80 it may be removed with relatively little effort by a knowledgable person.

The patent to Rockenbauer discloses a two-part enclosure for enclosing the swivel nut which connects the inlet and outlet pipes to the pipeline. The two parts are connected together by "clinching" metallic tabs from one part over a portion of the other part to thereby hold it together. According to the teachings of this patent, any attempt to bend the tongues or lugs to effect a disconnect between the two portions will cause the tongues to break off thereby making attempts at tampering apparent. However, in conventional production methods, it is difficult to control the composition of the material and the strength of the tabs so that they will not break off when they are first bent in initial assembly, but will break off the first time any future attempt is made to bend them. Often times such tabs will break off during initial assembly or with care may subsequently be bent to allow disassociation of the two parts.

The patent to Rutten also shows a two-part enclosure enclosing the swivel nuts which connect the inlet and outlet of the gas meter into the exterior piping. However, this device also requires the use of a seal which unless carefully applied, can be manipulated to allow access to the interior of the enclosure or may be carefully removed and replaced after access has been gained to the swivel nut.

The patent to Morreale et al discloses two-part caps enclosing the swivel nuts with a bar integrally formed on and extending between the caps enclosing the swivel nuts at the inlet and outlet of the meter. The two parts of the cap embrace the swivel nut and are locked together by a conventional lock. Again, the disclosed arrangement requires a separate lock, which is relatively expensive and is subject to being "picked."

The patent to Talaga shows an enclosure enclosing a swivel nut which is comprised of a cap 16 and a destructible washer member 24. A one-way drive connection between the hexagonal cap 16 and internally threaded sleeve 20 is provided by means of roller pin 23 and slot 22. The pipe 11 is connected to pipe 12 by rotating the cap member 16 in the proper direction to thread the sleeve 20 onto the threaded portion 21 of the pipe 12. The one-way drive connection establishes a drive connection to drive the sleeve 20 in a direction to tighten the connection, but will allow the cap 16 to rotate freely relative to the sleeve 20 when rotated in a direction to disconnect the two pipes. In order to remove the cap 22 and gain access to the interior thereof, it is necessary to destroy the washer member 24, In this case it should be noted that the cap or shell 16 which encloses the sleeve 20 is also part of the means to achieve a connection between the pipes 11 and 12. Thus, this device represents a specialized pipe connection which cannot be applied to conventional swivel nuts and cannot be applied to meters already in the field which employ conventional swivel nuts.

It is therefore an object of applicant's invention to provide means to prevent undetectable disconnection of the meter from the line and/or access to the interior of the meter which means is simple, economical to manufacture, does not require a special arrangement to connect the meter to the external piping, can be applied to swivel nuts employed on meters already in the field, and does not require the use of the sealing devices to prevent unauthorized access to the swivel nut connecton. To achieve this applicant has provided a two-part enclosure cap which loosely encloses a conventional swivel nut and is comprised of two cylindrical sleeve members, one telescoped within the other, with means to prevent disassembly of the two members once they are assembled together to enclose the swivel nut, whereby access to the swivel nut cannot be gained without destroying one or both members.

In another form of the invention a closure plate extending between the inlet and outlet of the meter closes an access opening in the top of the meter, unauthorized removal of the plate being prevented by the two-part swivel nut enclosure.

DETAILED DESCRIPTION OF THE INVENTION

Figure 1:
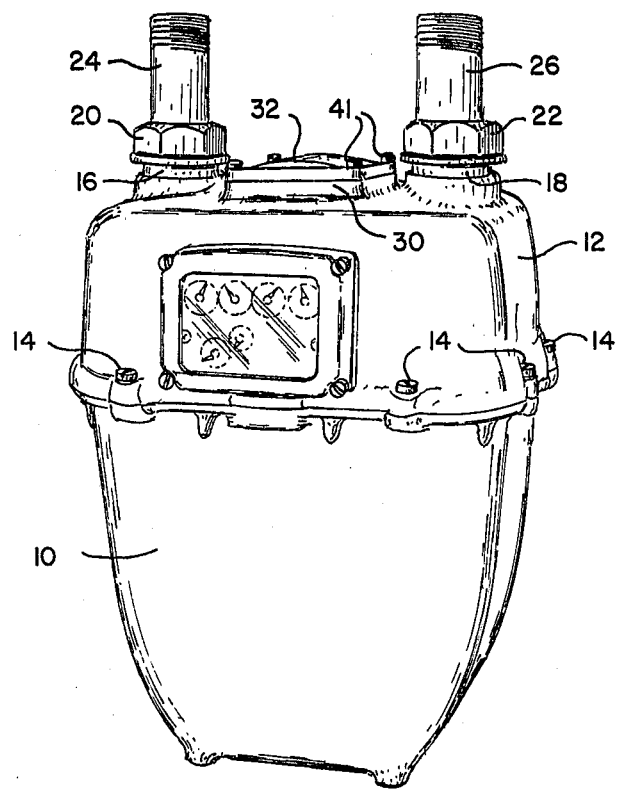
FIG. 1 is a front elevation view of a conventional meter showing conventional swivel nuts for connecting the meter to external piping.

Referring to the drawings, FIG. 1 shows a conventional meter with which the instant invention is particularly adapted for use. It is comprised of a lower housing 10 on which is mounted an upper housing 12 by means of a plurality of spaced screws 14. An inlet ferrule 16 and an outlet ferrule 18 are threaded into the upper housng 12 as shown. Swivel nuts 20 and 22 are threaded onto the ferrule 16 and 18 respectively and secure swivel 24 to inlet ferrule 16 and swivel 26 to outlet ferrule 18. A raised boss 30 is formed on the top surface of the housing 12 between the ferrule 16 and 18 and surrounds an access opening to the interior of the upper housing 12 where the various valves and control elements which control the operation of the meter are located. These internal elements and the operation thereof are described in aforementioned U.S. Pat. No. 2,544,665. A closure plate 32 is removably secured to the top of boss 30 by means of screws 41 as shown. Access to the interior of housing 12 may be gained whereby adjustments for proper timing of the control valves and accuracy may be quickly made by simple removal of the screws 41. It will be understood, however, that access to the interior of the housing 10 by unauthorized individuals will also permit adjustment or injury or destruction of the internal control elements whereby the meter will not properly register the gas passed through the meter.

Figure 2:
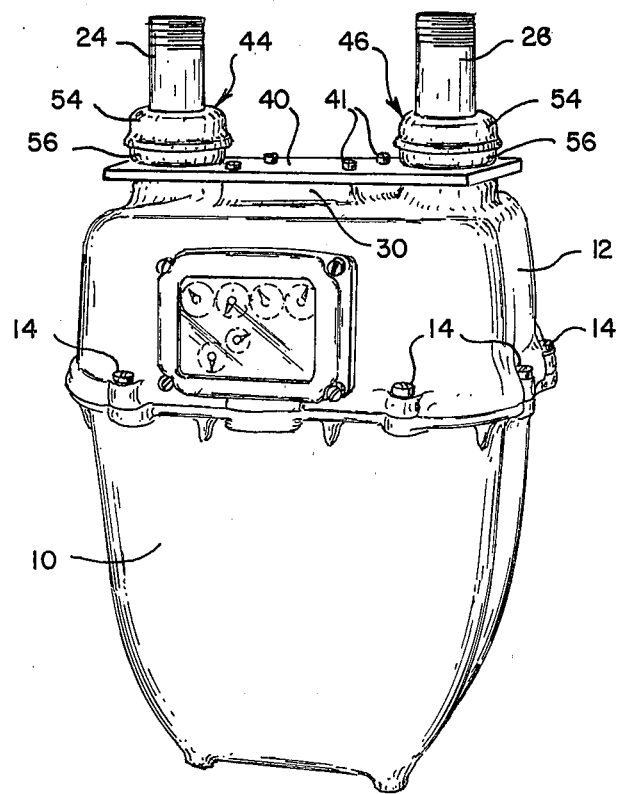
FIG. 2 is a front elevation of a similar meter having the swivel nut caps and closure plate of the instant invention.

FIG. 2 shows a meter similar to that shown in FIG. 1 on which is employed applicant's invention. In this arrangement, the closure plate 32 of FIG. 1 has been replaced by closure plate 40 which extends between the inlet and outlet connections as shown. Mounting of the plate 40 on the meter is facilitated by openings, one of which is shown at 42 in FIG. 3 through which the inlet ferrule 16 and outlet ferrule 18 project. Unauthorized removal of the plate 40 is prevented by means of the tamper proof caps 44 and 46 which enclose the swivel nuts connecting the swivels 24 and 26 to the meter. While FIG. 3 shows a full circle opening through the plate 40, it will be understood that all that is necessary is that the plate 40 be provided with arms or equivalent which embrace the ferrules a sufficient amount to prevent removal of the plate without removal of caps 44 and 46.

Figure 3:
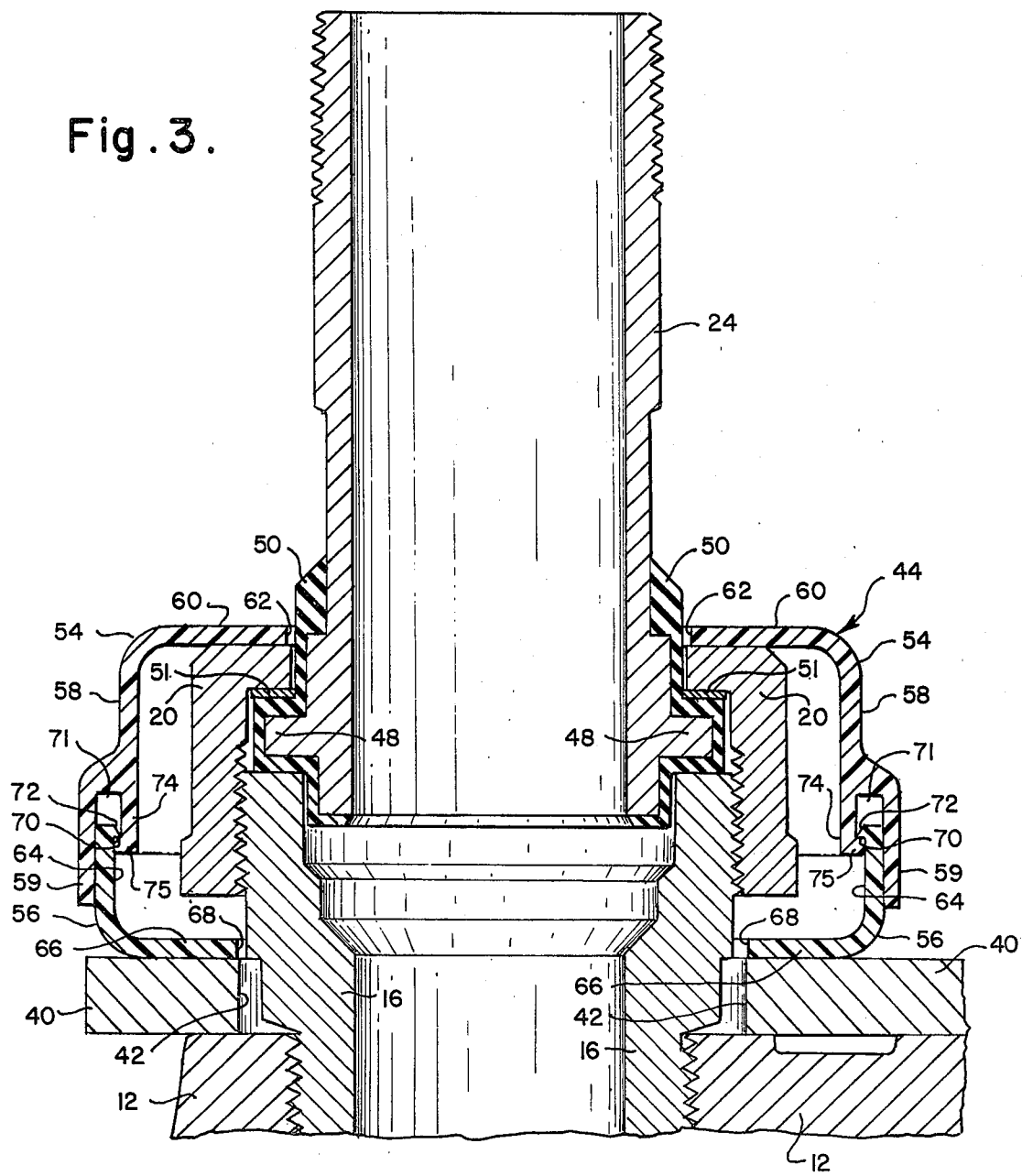
FIG. 3 shows the internal details of the tamper proof swivel nut cap employed in the instant invention.

FIG. 3 shows the details of the assembly of tamper proof cap 44, the swivel 24, ferrule 16 and closure plate 40. As shown, the end of the swivel 24 is formed with a flange 48. A sleeve 50 of rubber or other material having similar qualities covers the end portion of the swivel 24 including the flange 48 to achieve a fluid tight connection between the swivel and the ferrule 16 and to electrically insulate the meter from the pipeline. A washer 51 is interposed between the swivel nut 20 and sleeve 51 to facilitate tightening of the swivel nut without undue deformation of the sleeve 50. The internally threaded swivel nut 20 is threaded onto a threaded portion of the ferrule 16 and serves to clamp the flange portion 48 of the swivel into sealing engagement with the end of the ferrule.

The tamper proof cap 44 which is identical to the cap 46 is comprised of two cylindrical sleeve members 54 and 56 which may be made of any suitable commercially available thermoplastic material such as Acetal. Member 54 is comprised of the cylindrical wall 58 having an offset skirt portion 59 and having a radially extending wall 60 at its top end with an opening 62 to accommodate swivel 24. Member 56 is comprised of a cylindrical wall 64 and a radially extending wall 66 having opening 68 to accommodate ferrule 16.

A camming surface 72 and a radially extending annular abutment surface 70 are formed on the interior surface of wall 64 at the open end of member 56 as shown in FIG. 3. It will be understood that both the camming surface 72 and the abutment 70 extend annularly around the end of the wall 64. A retainer portion 74 is formed on the interior of sleeve 58 which is inwardly spaced from skirt portion 59 to provide an annular recess 71 for the reception of the free end of wall 64 when the sleeve members 56 and 58 are assembled together. An annular abutment 75 is formed on the free end of retainer 74 which cooperates with abutment 70 on wall 64 to prevent disassembly of sleeve member 56 and 58 once they are assembled together.

In assembling the plate 40 and caps 44 and 46 onto the meter, the plate 40 is mounted on the top of boss 30 with the ferrules 16 and 18 projecting through the openings 42 and the plate is then secured to the boss by means of screws 41. The inner telescoping members 56 are then assembled onto the ferrules 16 and 18 with the ferrules projecting through the openings 68 and the bottom radial surface 66 of the member 56 resting on the top of plate 40. With the member 56 in this position, there is a sufficient length of the threaded portion of the ferrules 16 and 18 exposed and not covered by the wall 64 so that the swivel nut 20 may be threaded onto the ferrules a sufficient amount to secure flange portion 48 of swivels 24 and 26 into fluid tight engagement with the ferrules. The sleeve member 54 which is previously mounted on swivel 24 through opening 62, and the member 56 are then manually urged into telescoping relationship until abutment 75 of the retainer 74 is snapped into engagement with abutment 70 on wall 64. It will be understood that the material of which sleeves 56 and 58 are made possesses some degree of resiliency so that in the relative movement during assembly of the members 54 and 56, the cam surface 72 will urge the free edge of the retainer 74 radially inward away from the path of movement of the abutment 70 until the camming surface is disengaged from the abutment 75 at which point the retainer will snap back into the position shown in FIG. 3. It will be appreciated that any attempt to disassemble the members 54 and 56 will be prevented by engagement of the abutment 70 and the abutment 75.

Since the retainer cap 44 cannot be removed, removal of the closure plate 40 is also prevented. Thus, not only does the cap member 44 prevent access to the swivel nut 20, but together with the plate 40, prevents unauthorized access to the handhole in the upper housing 12. When authorized personnel desire to have access to the swivel nut, the member 54 and 56 are simply pried apart or removed by cutting by means of an appropriate instrument. Since the cap is comprised merely of two inexpensive elements, the cap is easily and economically replaced if an when desired.

It will also be understood that the retainer member 74 which is shown as being integrally formed on the interior of sleeve member 54, could also be secured to the interior of member 56 and adapted to engage with an abutment and a cam surface on the interior of member 54. It is also possible to make the retainer 74 or its equivalent separate from the sleeve members and to secure it to the interior of either one of members 54 and 56 by any one of a number of well known methods such as fusing or a press fit.

Thus, applicant has provided a very economical, tamper proof cap for enclosing the swivel nut of a gas meter, which cap does not require the use of seals, is very economical to produce, does not require a special swivel nut, and which cooperates with a closure plate to prevent unauthorized access to the handhole in upper housing 12, both of which cap and closure plate can be readily applied to meters now in the field.

The invention herein described may be embodied in other specific forms without departing from the spirit or essential characteristics thereof. The present embodiment is therefore considered as illustrative and not restrictive, the scope of the invention being indicated by the appended claims and all departures from the foregoing description which come within the meaning and range of equivalency of the claims are therefore intended to be embraced therein.

I claim:

1. An enclosure for loosely enclosing a gas meter swivel nut comprised of first and second cylindrical sleeve members of easily destructable material each having cylindrical side walls spaced from said nut and terminating in free ends, the free end of said second sleeve member being telescoped within the free end of said first sleeve member, cooperating locking means respectively within each of said sleeve members preventing disassembly of said sleeve members from each other whereby access to the interior of said enclosure can be achieved only by destruction thereof, said locking means being comprised of a resilient retainer secured within said first sleeve member having an abutment portion on the free edge thereof, abutment means on the interior of said second sleeve member which is engaged by the abutment portion of said retainer when said sleeve members are in assembled relationship thereby preventing diassembly of said sleeve members from one another.

2. The invention defined in claim 1 in which the abutment means on one of said second sleeve member or retainer has a camming portion which is adapted to engage the free end of the other of said second sleeve member or said retainer to move the free end of said retainer out of the path of movement of the abutment on said second sleeve member when said sleeve members are being telescoped together during assembly, the free end of said retainer being adapted to return to the path of movement of the abutment on said second member when said abutment has been moved beyond the plane of the abutment portion on said first sleeve member.

3. A gas meter comprised of a housing, spaced inlet and outlet ferrules projecting from said housing, an access opening in said housing between said ferrules, a closure plate having means embracing at least a portion of the peripheries of said ferrules when said plate is mounted to close said access opening, means for connecting said ferrule to a pipeline comprised of, swivel nuts respectively threaded on said ferrules preventing removal of said plate, a cap separate from said plate loosely enclosing said nut, access to the interior of which cap can be achieved only by destruction thereof.

4. The invention defined in claim 3 in which said cap is comprised of an assembly of a first sleeve member telescoped over a second sleeve member and locking means within said cap preventing disassembly of one sleeve member from the other.

5. The invention defined in claim 4 in which said locking means is comprised of a resilient retainer secured to the interior of one of said sleeve members and having a free end, abutment means on the interior of the other of said sleeve members which is engaged by the free end of said retainer when said sleeve members are in assembled relationship thereby preventing disassembly of said sleeve elements from one another.

6. The invention defined in claim 5 in which the other of said sleeve member has a camming portion in the interior thereof which is adapted to engage the free end of said retainer to move the free end of said retainer out of the path of movement of said abutment when said sleeve elements are being telescoped together during assembly, the free end of said retainer being adapted to return to the path of movement of said abutment when said abutment has been moved beyond the plane of the free end of said retainer.

7. The invention defined in claim 6 in which said second sleeve member is adjacent to said plate and the cylindrical wall thereof is of such a length as to permit access to said swivel nut before said sleeve members are assembled into telescoping relationship with each other.

8. An enclosure for loosely enclosing a gas meter swivel nut comprising: first and second cylindrical sleeve members of easily destructable material and having free end portions, the end portion of said second sleeve member being telescoped within the free end portion of said first sleeve member, a retainer wall coaxial with said end portion of said first sleeve member and radially inwardly spaced therefrom to provide an annular recess between said retainer wall and the free end portion of said first sleeve member, an annular radially extending first abutment circumscribing the exterior of said retainer wall, said abutment having an abutment face facing away from the free end of said first sleeve member, a second annular abutment extending radially inward from the free end of said second sleeve member, a radial abutment face on said second abutment facing away from the free end of said second sleeve member, the free end of said second sleeve member being received in said annular recess whereby the abutment face on said first sleeve member engages the abutment face on said second sleeve member to prevent withdrawal of the free end of said second sleeve member from said annular recess.

9. The invention defined in claim 8 in which the abutment means on one of said second sleeve member or retainer has a camming portion which is adapted to engage the free end of the other of said second sleeve member or said retainer to move the free end of said retainer out of the path of movement of the abutment on said second sleeve member when said sleeve members are being telescoped together during assembly, the free end of said retainer being adapted to return to the path of movement of the abutment on said second member when said abutment has been moved beyond the plane of the abutment portion on said first sleeve member.

* * * * *